Jan. 14, 1958     C. BAUR ET AL     2,819,652
TELEPHOTO OBJECTIVE

Filed March 6, 1956     2 Sheets-Sheet 1

INVENTORS:
CARL BAUR
CHRISTIAN OTZEN
BY: Michael S. Striker
agt.

Jan. 14, 1958  C. BAUR ET AL  2,819,652
TELEPHOTO OBJECTIVE
Filed March 6, 1956  2 Sheets-Sheet 2
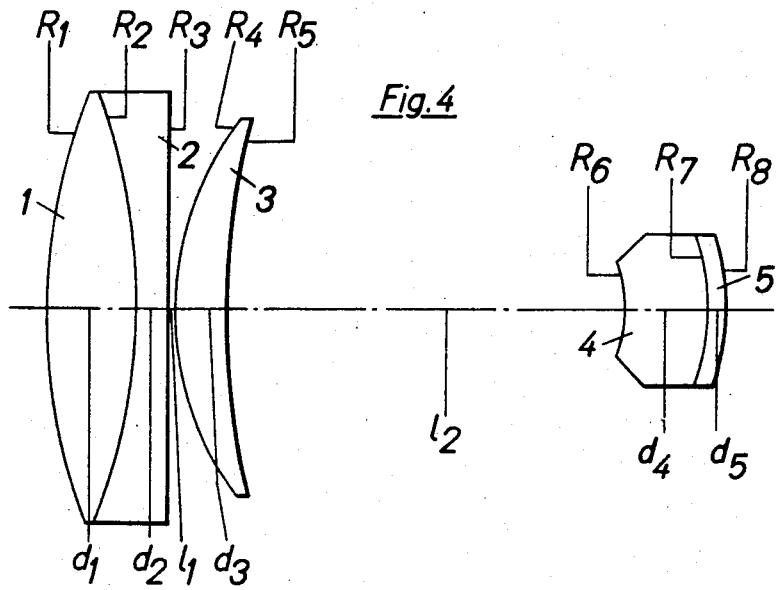
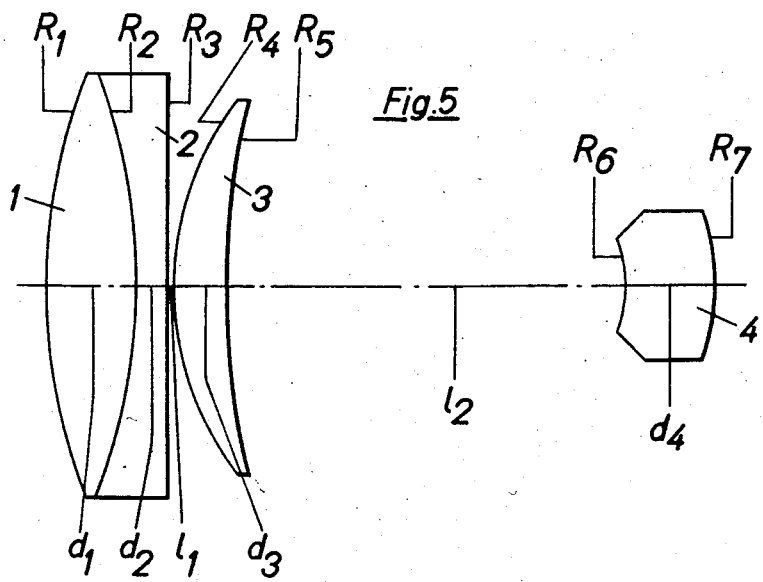
INVENTORS:
CARL BAUR
CHRISTIAN OTZEN
BY: Michael S. Striker
agt.

United States Patent Office 2,819,652
Patented Jan. 14, 1958

2,819,652

TELEPHOTO OBJECTIVE

Carl Baur, Munich-Baldham, and Christian Otzen, Munich, Germany, assignors to Firma Agfa Camera-Werk Aktiengesellschaft, Munich, Germany Application March 6, 1956, Serial No. 569,925

Claims priority, application Germany March 12, 1955

18 Claims. (Cl. 88—57)

The present invention relates to a telephoto objective, and more particularly to a telephoto objective comprising a positive meniscus doublet in front, a negative meniscus in the rear, and a positive single meniscus arranged between the front meniscus and the rear meniscus and being located closely behind the positive front meniscus.

Photographic cameras permitting an exchange of objectives having different focal lengths are known in which a central shutter is arranged between the objective and the film plane. Such cameras permit the use of standard objectives, wide angle objectives, and teleobjectives. If this arrangement is used in miniature cameras having a frame size 24 by 36 mm., the construction of the camera limits the size of the shutter whereby the possibility of using telephoto objectives having a great focal length is restricted. The maximal focal length of teleobjectives used in miniature cameras is 90 mm., such teleobjectives still produce a sufficient marginal brightness of the picture although the danger of screening the rays is present due to the fact that the central shutter is arranged behind the objective.

It is the object of the present invention to provide a telephoto objective having a far greater focal length than the known teleobjectives used for photographic cameras having a central shutter arranged between the objective and the image plane.

It is another object of the present invention to provide a telephoto objective having a focal length of 135 mm. which can be used in a miniature camera having a frame size 24 by 36 mm. and a shutter between the objective and the image plane.

It is another object of the present invention to provide a telephoto objective having a focal length of 135 mm. in which marginal screening by a shutter arranged between the objective and the film plane is prevented.

It is another object of the present invention to provide in a telephoto objective a front component which has a diameter greater than the diameter required by the relative aperture of the entire objective.

It is a further object of the present invention to provide a telephoto objective of the above described type in which the spherical aberration for two different wave lengths of the spectrum is corrected while at the same time lateral color aberration is eliminated.

It is a further object of the present invention to provide a telephoto objective of the above described type in which coma, chromatic aberration, astigmatism, curvature of image field, and distortion are almost completely eliminated within an angle of field of 20°.

It is a further object of the present invention to provide a telephoto objective having a focal length of 135 mm. and a relative aperture 1:4 producing a marginal brightness of the image which is at least 35% of the brightness at the center of the image.

With these objects in view, the present invention mainly consists in a teleobjective which comprises a positive front member having a diameter at least 1.17 times the maximum diameter of the aperture of the objective, a negative rear member axially spaced from the positive front member, and a positive middle member located between the positive front member and the negative rear member, the focal length of the positive front member being greater than 2.5 times and less than 5.0 times the focal length of the objective as a whole, and the focal length of the positive middle member being greater than 0.6 times and less than 0.9 times the focal length of the objective as a whole.

According to one embodiment of the present invention, the negative rear member is a cemented meniscus triplet. According to another embodiment of the present invention, the negative rear member is a cemented meniscus doublet. According to a third embodiment of the present invention, the negative rear member is a meniscus singlet. Preferably, the positive front member is a cemented meniscus doublet and all the concave surfaces of the negative rear meniscus are concave to the front. In the embodiments in which the negative rear member is a meniscus doublet or meniscus triplet, the cemented interfaces are preferably collective. According to a preferred arrangement, the positive middle member is spaced from the negative rear member an axial air space which is between 0.34 times and 0.44 times the focal length of the objective as a whole. The thickness of the negative rear member is preferably greater than 0.05 times and less than 0.15 times the focal length of the objective. The absolute sum of the radii of the refractive surfaces of the negative rear member is preferably a value between 0.2 times and 1.5 times the focal length of the objective as a whole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is a side view of a telephoto objective according to another embodiment of the present invention; and Fig. 5 is a side view of a third embodiment of the present invention.

Figure 1:
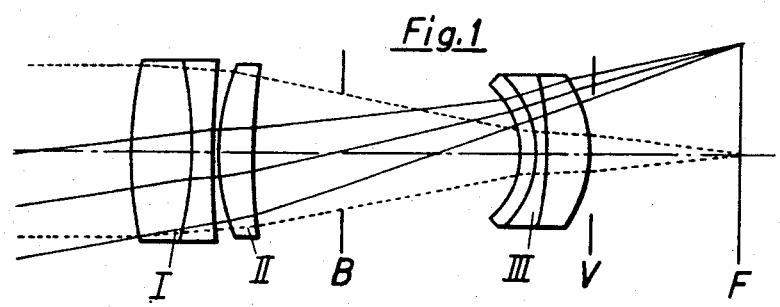
Fig. 1 is a side view of a telephoto objective having a great focal length and arranged in a miniature camera.
Figure 2:
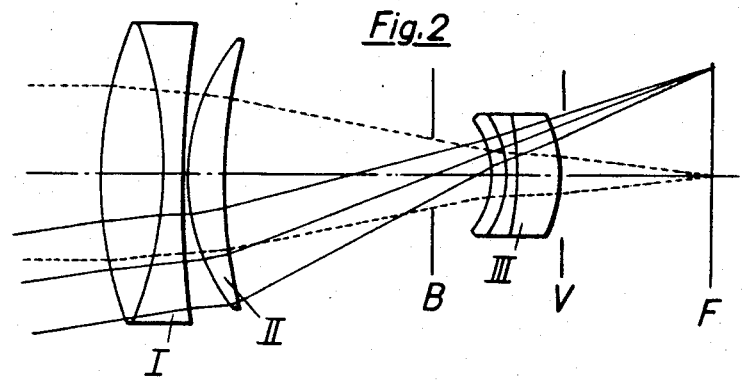
Fig. 2 is a side view of a telephoto objective according to the present invention arranged in a miniature camera.

The principle of the present invention, and the problems and difficulties involved will be best understood with reference to Figs. 1 and 2. Figs 1 and 2 illustrate telephoto objectives having positive front members I, negative rear members III, and middle members II arranged closely behind the front members I. Both objectives are assumed to have a focal length of 135 mm., and a relative aperture of 1:4. Between the middle member II and the rear member III is arranged a diaphragm B, and behind the rear member is arranged a shutter V. The shutter V is arranged between the rear member III and the film plane F. The broken lines illustrate rays entering parallel to the axis of the objective and forming an image point in the film plane or image plane F. The bundles of rays shown in solid lines in Figs. 1 and 2 represent parallel rays entering oblique to the axis of the objective and producing an image point in the corner of the film frame of the size 24 by 36 mm. The illustration is made in such a manner that the oblique bundle of rays has the same width in a meridian section.

It will be noted that the diameters of the lenses I and II are substantially greater in the objective according to the present invention shown in Fig. 2 than in the objective shown in Fig. 1. In the arrangement shown in Fig. 1, the marginal rays are considerably screened off by the shutter V. Due to the greater diameter of the front member I, no marginal screening takes place in the arrangement of Fig. 2, and consequently it is necessary that the members I and II have greater diameter than would be required for the bundle of rays parallel to the axis of the objective. By increasing the diameter of the front member, it is possible to decrease the diameter of the rear member III to such extent that no marginal screening by the shutter V takes place. It is, however, necessary to arrange the diaphragm B closer to the rear member III as compared with the arrangement shown in Fig. 1.

In accordance with the present invention, the positive front member of the telephoto objective has a diameter at least 1.17 times the maximum diameter of the aperture of the objective. In a telephoto objective according to the present invention having a relative aperture of 1:4, the necessary marginal brightness of the image is produced by providing a positive front member having an aperture of 2.4 or 2.5, respectively.

In accordance with the present invention, the back focal length of the objective is made between 20% and 25% of the focal length of the objective as a whole so that the vertex of the rear member III is located near the shutter V. This arrangement has a favorable influence on the marginal brightness.

It will be understood that in a telephoto objective of this type, difficulties will be encountered as regards the coma, the chromatic aberration, astigmatism and the lateral color aberration.

In accordance with the present invention, all aberrations are eliminated to the greatest extent in a teleobjective by the following measures:

The negative rear member is a meniscus whose concave surfaces are concave to the front, the focal length of the positive front member is greater than 2.5 times and less than 5.0 times the focal length of the objective as a whole, and the focal length of the positive middle member is greater than 0.6 times and less than 0.9 times the focal length of the objective as a whole.

Figure 3:
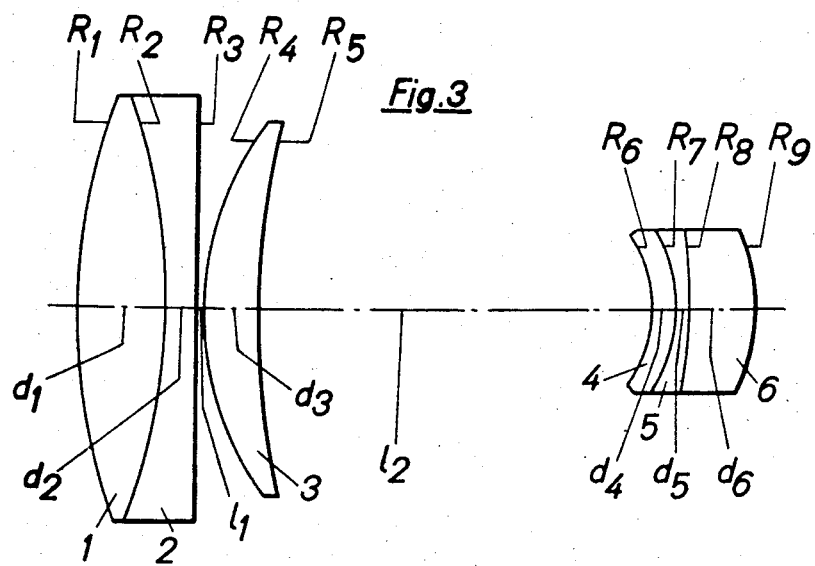
Fig. 3 is a side view of a telephoto objective according to one embodiment of the present invention.

Referring now to the embodiment illustrated in Fig. 3, the positive front member is a positive meniscus doublet composed of a positive lens element 1 and a negative lens element 2 which are cemented together along an interface. Lens 1 has an outer air surface having the radius $R_1$ and a cemented contact surface having the radius $R_2$. Lens 2 has an outer surface having the radius $R_3$ and a cemented contact surface having the radius $R_2$. The lenses 1 and 2 have thicknesses $d_1$ and $d_2$ respectively.

A positive meniscus singlet 3 is arranged directly behind the front member 1, 2 and is spaced from the same by the air space $l_1$. The positive meniscus singlet 3 is bounded by outer surfaces having the radii $R_4$ and $R_5$, respectively. The thickness of the meniscus singlet 3 is $d_3$. The negative rear member is spaced an air space $l_2$ from the middle member 3, and is a negative meniscus triplet composed of lenses 4, 5 and 6. Lens 4 is bounded by an outer concave air surface having a radius of curvature $R_6$ and by a cemented contact surface having the radius $R_7$. Lens 5 is bounded by the contact surface having the radius $R_7$ and by a contact surface having the radius $R_8$. Lens 6 is bounded by the contact surface having the radius $R_8$ and by an outer air surface $R_9$. All concave surfaces of the meniscus triplet are concave to the front. The lens elements 4, 5 and 6 have thicknesses $d_4$, $d_5$ and $d_6$, respectively.

In accordance with the present invention, the absolute sum of the radii of the refractive surfaces is a value between 0.5 times and 1.5 times the focal length of the objective as a whole. This relation may be mathematically expressed as follows:

$$0.5f \leq (R_6 + R_7 + R_8 + R_9) \leq 1.5f$$

Fig. 4 illustrates an embodiment of the present invention in which the negative rear member is a cemented meniscus doublet. The positive front member 1, 2 and the positive meniscus singlet 3 are constructed in the same manner as described with reference to Fig. 3. The negative rear member is a cemented doublet composed of a lens element 4 and a lens element 5. The lens element 4 has an outer surface having a radius of curvature $R_6$ and a contact surface having the radius of curvature $R_7$. The lens element 5 has a contact surface having the radius $R_7$ and an outer air surface having the radius $R_8$. The lens elements 4 and 5 have the thicknesses $d_4$ and $d_5$, respectively. All concave refractive surfaces of the lens elements 4 and 5 are concave to the front.

According to the present invention, the negative meniscus doublet 4, 5 is so designed that the absolute sum of the radii of the refractive surfaces of the meniscus doublet 4, 5 is a value between 0.3 times and 1.0 times the focal length of the objective as a whole. This condition may be mathematically expressed as follows:

$$0.3f \leq (R_6 + R_7 + R_8) \leq 1.0f$$

Fig. 5 illustrates a third embodiment of the present invention in which the negative rear member is a negative meniscus singlet having the concave surface thereof facing front. The positive front member 1, 2 and the positive meniscus singlet 3 correspond to elements described with reference to Fig. 3. In the embodiment of Fig. 5, the meniscus singlet 4 is so designed that the absolute sum of the radii of the refractive surfaces of the meniscus singlet 4 is a value between 0.2 times and 0.6 times the focal length of the objective as a whole.

This condition may be mathematically expressed by the following equation:

$$0.2f \leq (R_6 + R_7) \leq 0.6f$$

In the embodiments illustrated in Figs. 3 and 4 in which the negative rear member is a multiple meniscus, the cemented interfaces are collective.

In accordance with the present invention, the air space $l_2$ between the positive meniscus singlet 3 and the negative rear member is within the range of 34% and 44% of the focal length of the objective as a whole. This condition may be mathematically expressed as follows:

$$0.34f \leq l_2 \leq 0.44f$$

In accordance with the present invention, the thickness of the negative rear member along the principal axis of the objective is greater than 0.05 times and less than 0.15 times the focal length of the objective as a whole. This condition may be mathematically expressed as follows:

$$0.05f \leq (d_4 + d_5 + d_6) \leq 0.15f$$

A telephoto objective constructed in accordance with one of the embodiments shown in Figs. 3, 4 and 5 and having a focal length of 135 mm., a relative aperture of 1:4, and being used in a camera having a frame size of 24 by 36 mm., produces a marginal brightness of the image which is greater than 35% than the marginal brightness at the center of the image although the shutter is arranged behind the objective.

In a teleobjective according to the present invention and having a relative aperture of 1:4, the spherical zonal aberration is reduced to a value below 0.04 mm., assuming zero value for the rim. Within the angle of field, a complete coincidence for the wave length of the lines of the spectrum D of helium, 587.6 m$\mu$, and G of mercury, 435.8 m$\mu$ so that lateral color aberration is fully corrected. Astigmatism, curvature of the image field, coma and distortion are almost completely eliminated within an angle of field of 20°.

The table of data for the teleobjective illustrated in Fig. 3 of the drawings is as follows:

Corrected angle of field 20°, relative aperture 1:4, focal length $f$ 1.000, back focal length 0.22432.

| Lens Elements | Radii | Thicknesses | $n_D$ | V |
|---|---|---|---|---|
| 1 | $R_1=+0.58974$ | $d_1=0.08957$ | 1.51633 | 64.0 |
|   | $R_2=-0.59467$ | | | |
| 2 |                | $d_2=0.03140$ | 1.67270 | 32.2 |
|   | $R_3=+1.88552$ | | | |
|   |                | $l_1=0.00470$ | | |
|   | $R_4=+0.30666$ | | | |
| 3 |                | $d_3=0.05467$ | 1.62280 | 56.9 |
|   | $R_5=+0.84262$ | | | |
|   |                | $l_2=0.39526$ | | |
|   | $R_6=-0.12732$ | | | |
| 4 |                | $d_4=0.02327$ | 1.67270 | 32.2 |
|   | $R_7=-0.15059$ | | | |
| 5 |                | $d_5=0.01163$ | 1.62299 | 58.1 |
|   | $R_8=-0.48068$ | | | |
| 6 |                | $d_6=0.06630$ | 1.51742 | 52.2 |
|   | $R_9=-0.18819$ | | | |

The table of data for the teleobjective illustrated in Fig. 4 of the drawings is as follows:

Corrected angle of field 20°, relative aperture 1:4, focal length $f$ 1.000, back focal length 0.22900.

| Lens Elements | Radii | Thicknesses | $n_D$ | V |
|---|---|---|---|---|
| 1 | $R_1=+0.57616$ | $d_1=0.08948$ | 1.51633 | 64.0 |
|   | $R_2=-0.60787$ | | | |
| 2 |                | $d_2=0.03137$ | 1.67270 | 32.2 |
|   | $R_3=+1.75871$ | | | |
|   |                | $l_1=0.00469$ | | |
|   | $R_4=+0.30635$ | | | |
| 3 |                | $d_3=0.05461$ | 1.62230 | 53.1 |
|   | $R_5=+0.83178$ | | | |
|   |                | $l_2=0.39638$ | | |
|   | $R_6=-0.12719$ | | | |
| 4 |                | $d_4=0.08315$ | 1.67270 | 32.2 |
|   | $R_7=-0.20668$ | | | |
| 5 |                | $d_5=0.01795$ | 1.51742 | 52.2 |
|   | $R_8=-0.20483$ | | | |

The table of data for the objective illustrated in Fig. 5 of the drawings is as follows:

Corrected angle of field 20°, relative aperture 1:4, focal length $f$ 1.000, back focal length 0.23282.

| Lens Elements | Radii | Thicknesses | $n_D$ | V |
|---|---|---|---|---|
| 1 | $R_1=+0.57616$ | $d_1=0.08948$ | 1.51633 | 64.0 |
|   | $R_2=-0.60787$ | | | |
| 2 |                | $d_2=0.03137$ | 1.67270 | 32.2 |
|   | $R_3=+1.75871$ | | | |
|   |                | $l_1=0.00469$ | | |
|   | $R_4=+0.30635$ | | | |
| 3 |                | $d_3=0.05461$ | 1.62230 | 53.1 |
|   | $R_5=+0.83178$ | | | |
|   |                | $l_2=0.39638$ | | |
|   | $R_6=-0.12719$ | | | |
| 4 |                | $d_4=0.09112$ | 1.67270 | 32.2 |
|   | $R_7=-0.20764$ | | | |

In the above tables, lens elements are numbered in order from front to rear in the first column, the radii of curvature R are given in the second column, the thicknesses $d$ of the lens elements and the spaces $l$ between the lens elements are given in the third column, each numbered by subscripts from front to rear. The fourth and fifth columns contain the respective refractive indices $n_D$ for the D line of the spectrum and the Abbe numbers V, respectively. The plus and minus values of R denote surfaces respectively convex and concave to the front.

It will be understood that each of the elements described above, or two or more together, may also find a useful application in other types of teleobjectives differing from the types described above.

While the invention has been illustrated and described as embodied in a telephoto objective having a cemented meniscus doublet in front, a negative meniscus in the rear, and a positive meniscus singlet between the front and the rear members, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A teleobjective comprising a positive front member having a diameter at least 1.17 times the maximum diameter of the aperture of the objective; a negative rear member axially spaced from said positive front member, said negative rear member being a cemented meniscus triplet having all the concave surfaces thereof concave to the front and having all cemented interfaces thereof collective, the absolute sum of the radii of the refractive surfaces of said meniscus triplet being a value between 0.5 times and 1.5 times the focal length of the objective as a whole; and a positive middle member located between said positive front member and said negative rear member, the focal length of said positive front member being greater than 2.5 times and less than 5.0 times the focal length of the objective as a whole, and the focal length of said positive middle member being greater than 0.6 times and less than 0.9 times the focal length of the objective as a whole.

2. A teleobjective comprising a positive front member having a diameter at least 1.17 times the maximum diameter of the aperture of the objective; a negative rear member axially spaced from said positive front member, said negative rear member being a cemented meniscus doublet having all the concave surfaces thereof concave to the front and having a collective cemented interface, the absolute sum of the radii of the refractive surfaces of said meniscus doublet being a value between 0.3 times and 1.0 times the focal length of the objective as a whole; and a positive middle member located between said positive front member and said negative rear member, the focal length of said positive front member being greater than 2.5 times and less than 5.0 times the focal length of the objective as a whole, and the focal length of said positive middle member being greater than 0.6 times and less than 0.9 times the focal length of the objective as a whole.

3. A teleobjective comprising a positive front member having a diameter at least 1.17 times the maximum diameter of the aperture of the objective; a negative rear member axially spaced from said positive front member, said negative rear member being a meniscus singlet having the concave surface thereof concave to the front, the absolute sum of the radii of the refractive surfaces of said meniscus singlet being a value between 0.2 times and 0.6 times the focal length of the objective as a whole; and a positive middle member located between said positive front member and said negative rear member, the focal length of said positive front member being greater than 2.5 times and less than 5.0 times the focal length of the objective as a whole, and the focal length of said positive middle member being greater than 0.6 times and less than 0.9 times the focal length of the objective as a whole.

4. A teleobjective comprising a positive front member having a diameter at least 1.17 times the maximum diameter of the aperture of the objective; a negative rear member axially spaced from said positive front member, said negative rear member being a cemented multiple meniscus having all cemented interfaces thereof collective; and a positive middle member located between said positive front member and said negative rear member, the focal length of said positive front member being greater than 2.5 times and less than 5.0 times the focal length of the objective as a whole, and the focal length of said positive middle member being greater than 0.6 times and less than 0.9 times the focal length of the objective as a whole.

5. A teleobjective comprising a positive front member being a cemented meniscus doublet having a diameter at least 1.17 times the maximum diameter of the aperture of the objective; a negative rear member axially spaced a substantial air space from said positive front member and being a cemented meniscus triplet having all the concave surfaces thereof concave to the front, all cemented interfaces of said rear member being collective, the absolute sum of the radii of the refractive surfaces of said meniscus triplet being a value between 0.5 times and 1.5 times the focal length of the objective as a whole; and a positive meniscus singlet arranged between said positive front member and said negative rear member closely behind said positive front member, the focal length of said positive front member being greater than 2.5 times and less than 5.0 times the focal length of the objective as a whole, and the focal length of said positive meniscus singlet being greater than 0.6 times and less than 0.9 times the focal length of the objective as a whole.

6. A teleobjective comprising a positive front member being a cemented meniscus doublet having a diameter at least 1.17 times the maximum diameter of the aperture of the objective; a negative rear member axially spaced a substantial air space from said positive front member and being a cemented meniscus doublet having all the concave surfaces thereof concave to the front and having a collective interface, the absolute sum of the radii of the refractive surfaces of said meniscus doublet being a value between 0.3 times and 1.0 times the focal length of the objective as a whole; and a positive meniscus singlet arranged between said positive front member and said negative rear member closely behind said positive front member, the focal length of said positive front member being greater than 2.5 times and less than 5.0 times the focal length of the objective as a whole, and the focal length of said positive meniscus singlet being greater than 0.6 times and less than 0.9 times the focal length of the objective as a whole.

7. A teleobjective comprising a positive front member being a cemented meniscus doublet having a diameter at least 1.17 times the maximum diameter of the aperture of the objective; a negative rear member axially spaced a substantial air space from said positive front member and being a meniscus singlet having all the concave surfaces thereof concave to the front, the absolute sum of the radii of the refractive surfaces of said meniscus singlet being a value between 0.2 times and 0.6 times the focal length of the objective as a whole; and a positive meniscus singlet arranged between said positive front member and said negative rear member closely behind said positive front member, the focal length of said positive front member being greater than 2.5 times and less than 5.0 times the focal length of the objective as a whole, and the focal length of said positive meniscus singlet being greater than 0.6 times and less than 0.9 times the focal length of the objective as a whole.

8. A teleobjective comprising a positive front member being a cemented meniscus doublet having a diameter at least 1.17 times the maximum diameter of the aperture of the objective; a negative rear member axially spaced a substantial air space from said positive front member and being a cemented multiple meniscus having all cemented interfaces thereof collective and having all the concave surfaces thereof concave to the front; and a positive meniscus singlet arranged between said positive front member and said negative rear member closely behind said positive front member, the focal length of said positive front member being greater than 2.5 times and less than 5.0 times the focal length of the objective as a whole, and the focal length of said positive meniscus singlet being greater than 0.6 times and less than 0.9 times the focal length of the objective as a whole.

9. A teleobjective comprising a positive front member being a cemented meniscus doublet having a diameter at least 1.17 times the maximum diameter of the aperture of the objective; a negative rear member axially spaced a substantial air space from said positive front member and being a meniscus having all the concave surfaces thereof concave to the front; and a positive meniscus singlet arranged between said positive front member and said negative rear member closely behind said positive front member, said positive meniscus singlet being spaced from said negative rear member an axial air space which is between 0.34 times and 0.44 times the focal length of the objective as a whole, the focal length of said positive front member being greater than 2.5 times and less than 5.0 times the focal length of the objective as a whole, and the focal length of said positive meniscus singlet being greater than 0.6 times and less than 0.9 times the focal length of the objective as a whole.

10. A teleobjective comprising a positive front member being a cemented meniscus doublet having a diameter at least 1.17 times the maximum diameter of the aperture of the objective; a negative rear member axially spaced a substantial air space from said positive front member and being a meniscus having all the concave surfaces thereof concave to the front, said negative rear member having along the principal axis of the objective a thickness which is greater than 0.05 times and less than 0.15 times the focal length of the objective as a whole; and a positive meniscus singlet arranged between said positive front member and said negative rear member closely behind said positive front member, the focal length of said positive front member being greater than 2.5 times and less than 5.0 times the focal length of the objective as a whole, and the focal length of said positive meniscus singlet being greater than 0.6 times and less than 0.9 times the focal length of the objective as a whole.

11. A teleobjective comprising a positive front member being a cemented meniscus doublet having a diameter at least 1.17 times the maximum diameter of the aperture of the objective; a negative rear member axially spaced a substantial air space from said positive front member and being a meniscus having all the concave surfaces thereof concave to the front, the absolute sum of the radii of the refractive surfaces of said negative rear member being a value between 0.2 times and 1.5 times the focal length of the objective as a whole, said negative rear member having along the principal axis of the objective a thickness which is greater than 0.05 times and less than 0.15 times the focal length of the objective as a whole; and a positive meniscus singlet arranged between said positive front member and said negative rear member closely behind said positive front member, said positive meniscus singlet being spaced from said negative rear member an axial air space which is between 0.34 times and 0.44 times the focal length of the objective as a whole, the focal length of said positive front member being greater than 2.5 times and less than 5.0 times the focal length of the objective as a whole, and the focal length of said positive meniscus singlet being greater than 0.6 times and less than 0.9 times the focal length of the objective as a whole.

12. A teleobjective comprising a positive front member being a cemented meniscus doublet having a diameter at least 1.17 times the maximum diameter of the aperture of the objective; a negative rear member axially spaced a substantial air space from said positive front member and being a cemented multiple meniscus having at least one cemented collective interface and having all the concave surfaces thereof concave to the front, said negative rear member having along the principal axis of the objective a thickness which is greater than 0.05 times and less than 0.15 times the focal length of the objective as a whole; and a positive meniscus singlet arranged between said positive front member and said negative rear member closely behind said positive front member, said positive meniscus singlet being spaced from said negative rear member an axial air space which is betweeen 0.34 times and 0.44 times the focal length of the objective as a whole, the focal length of said positive front member being greater than 2.5 times and less than 5.0 times the focal length of the objective as a whole, and the focal length of said positive meniscus singlet being greater than 0.6 times and less than 0.9 times the focal length of the objective as a whole.

13. A telephoto objective constructed substantially according to the specifications in the following table:

| Lens Elements | Radii | Thicknesses | $n_D$ | V |
|---|---|---|---|---|
| 1 | $R_1 = +0.58974f$<br>$R_2 = -0.59467f$ | $d_1 = 0.08957f$ | 1.51633 | 64.0 |
| 2 | $R_3 = +1.88552f$ | $d_2 = 0.03140f$ | 1.67270 | 32.2 |
|   |  | $l_1 = 0.00470f$ |  |  |
| 3 | $R_4 = +0.30666f$<br>$R_5 = +0.84262f$ | $d_3 = 0.05467f$ | 1.62280 | 56.9 |
|   |  | $l_2 = 0.39526f$ |  |  |
| 4 | $R_6 = -0.12732f$<br>$R_7 = -0.15059f$ | $d_4 = 0.02327f$ | 1.67270 | 32.2 |
| 5 | $R_8 = -0.48068f$ | $d_5 = 0.01163f$ | 1.62299 | 58.1 |
| 6 | $R_9 = -0.18819f$ | $d_6 = 0.06630f$ | 1.51742 | 52.2 | wherein the first column lists six lens elements in numerals in order from front to rear; and wherein $f$ is the focal length of the objective, $n_D$ is the index of refraction for the D line of the spectrum, V is the dispersive index, R, $d$ and $l$ refer, respectively, to the radii of curvature of the refractive surfaces, the axial thicknesses of the lens elements, and the air spaces between the lenses, the subscripts on the characters R, $d$ and $l$ being numbered consecutively from the front, the plus and minus signs in the second column corresponding to refractive surfaces which are respectively convex and concave to the front.

14. A telephoto objective constructed substantially according to the specifications in the following table:

| Lens Elements | Radii | Thicknesses | $n_D$ | V |
|---|---|---|---|---|
| 1 | $R_1 = +0.57616f$<br>$R_2 = -0.60787f$ | $d_1 = 0.08948f$ | 1.51633 | 64.0 |
| 2 | $R_3 = +1.75871f$ | $d_2 = 0.03137f$ | 1.67270 | 32.2 |
|   |  | $l_1 = 0.00469f$ |  |  |
| 3 | $R_4 = +0.30635f$<br>$R_5 = +0.83178f$ | $d_3 = 0.05461f$ | 1.62230 | 53.1 |
|   |  | $l_2 = 0.39638f$ |  |  |
| 4 | $R_6 = -0.12719f$<br>$R_7 = -0.20668f$ | $d_4 = 0.08315f$ | 1.67270 | 32.2 |
| 5 | $R_8 = -0.21483f$ | $d_5 = 0.01795f$ | 1.51742 | 52.2 | wherein the first column lists five lens elements in numerals in order from front to rear; and wherein $f$ is the focal length of the objective, $n_D$ is the index of refraction for the D line of the spectrum, V is the dispersive index, R, $d$ and $l$ refer, respectively, to the radii of curvature of the refractive surfaces, the axial thicknesses of the lens elements, and the air spaces between the lenses, the subscripts on the characters R, $d$ and $l$ being numbered consecutively from the front, the plus and minus signs in the second column corresponding to refractive surfaces which are respectively convex and concave to the front.

15. A telephoto objective constructed substantially according to the specifications in the following table:

| Lens Elements | Radii | Thicknesses | $n_D$ | V |
|---|---|---|---|---|
| 1 | $R_1 = +0.57616f$<br>$R_2 = -0.60787f$ | $d_1 = 0.08948f$ | 1.51633 | 64.0 |
| 2 | $R_3 = +1.75871f$ | $d_2 = 0.03137f$ | 1.67270 | 32.2 |
|   |  | $l_1 = 0.00469f$ |  |  |
| 3 | $R_4 = +0.30635f$<br>$R_5 = +0.83178f$ | $d_3 = 0.05461f$ | 1.62230 | 53.1 |
|   |  | $l_2 = 0.39638f$ |  |  |
| 4 | $R_6 = -0.12719f$<br>$R_7 = -0.20764f$ | $d_4 = 0.09112f$ | 1.67270 | 32.2 | wherein the first column lists four lens elements in numerals in order from front to rear; and wherein $f$ is the focal length of the objective, $n_D$ is the index of refraction for the D line of the spectrum, V is the dispersive index; R, $d$ and $l$ refer, respectively, to the radii of curvature of the refractive surfaces, the axial thicknesses of the lens elements, and the air spaces between the lenses, the subscripts on the characters R, $d$ and $l$ being numbered consecutively from the front, the plus and minus signs in the second column corresponding to refractive surfaces which are respectively convex and concave to the front.

16. A teleobjective comprising a positive front member having a diameter at least 1.17 times the maximum diameter of the aperture of the objective; a negative rear member axially spaced from said positive front member, said negative rear member having along the principal axis of the objective a thickness which is greater than 0.05 times and less than 0.15 times the focal length of the objective as a whole; and a positive middle member located between said positive front member and said negative rear member, said positive middle member being spaced from said negative rear member and axial air space which is between 0.34 times and 0.44 times the focal length of the objective as a whole the focal length of said positive front member being greater than 2.5 times and less than 5.0 times the focal length of the objective as a whole, and the focal length of said positive middle member being greater than 0.6 times and less than 0.9 times the focal length of the objective as a whole.

17. A teleobjective comprising a positive front member having a diameter at least 1.17 times the maximum diameter of the aperture of the objective; a negative rear member axially spaced from said positive front member, said negative rear member being a meniscus, said negative rear member having along the principal axis of the objective a thickness which is greater than 0.05 times and less than 0.15 times the focal length of the objective as a whole the absolute sum of the radii of the refractive surfaces of said negative rear member being a value between 0.2 times and 1.5 times the focal length of the objective as a whole; and a positive middle member located between said positive front member and said negative rear member, said negative rear member having along the principal axis of the objective a thickness which is greater than 0.05 times and less than 0.15 times the focal length of the objective as a whole the focal length of said positive front member being greater than 2.5 times and less than 5.0 times the focal length of the objective as a whole, and the focal length of said positive middle member being greater than 0.6 times and less than 0.9 times the focal length of the objective as a whole.

18. A teleobjective comprising a positive front member being a cemented meniscus doublet having a diameter at least 1.17 times the maximum diameter of the aperture of the objective; a negative rear member axially spaced a substantial air space from said positive front member and being a meniscus having all the concave surfaces thereof concave to the front, said negative rear member having along the principal axis of the objective a thickness which is greater than 0.05 times and less than 0.15 times the focal length of the objective as a whole; and a positive meniscus singlet arranged between said positive front member and said negative rear member closely behind said positive front member, said positive meniscus singlet being spaced from said negative rear member an axial air space which is between 0.34 times and 0.44 times the focal length of the objective as a whole, the focal length of said positive front member being greater than 2.5 times and less than 5.0 times the focal length of the objective as a whole, and the focal length of said positive meniscus singlet being greater than 0.6 times and less than 0.9 times the focal length of the objective as a whole.

References Cited in the file of this patent

UNITED STATES PATENTS

| | | | |
|---|---|---|---|
| 1,085,868 | Konig | Feb. 3, | 1914 |
| 2,321,973 | Bennett | June 15, | 1943 |
| 2,660,093 | Bertele | Nov. 24, | 1953 |

FOREIGN PATENTS

| | | | |
|---|---|---|---|
| 316,246 | Germany | Nov. 24, | 1919 |
| 318,178 | Germany | Jan. 15, | 1920 |
| 398,431 | Germany | July 14, | 1924 |
| 222,709 | Great Britain | Oct. 9, | 1924 |
| 487,271 | Germany | Dec. 11, | 1929 |
| 861,161 | Germany | Dec. 29, | 1952 |